United States Patent Office 3,829,292
Patented Aug. 13, 1974

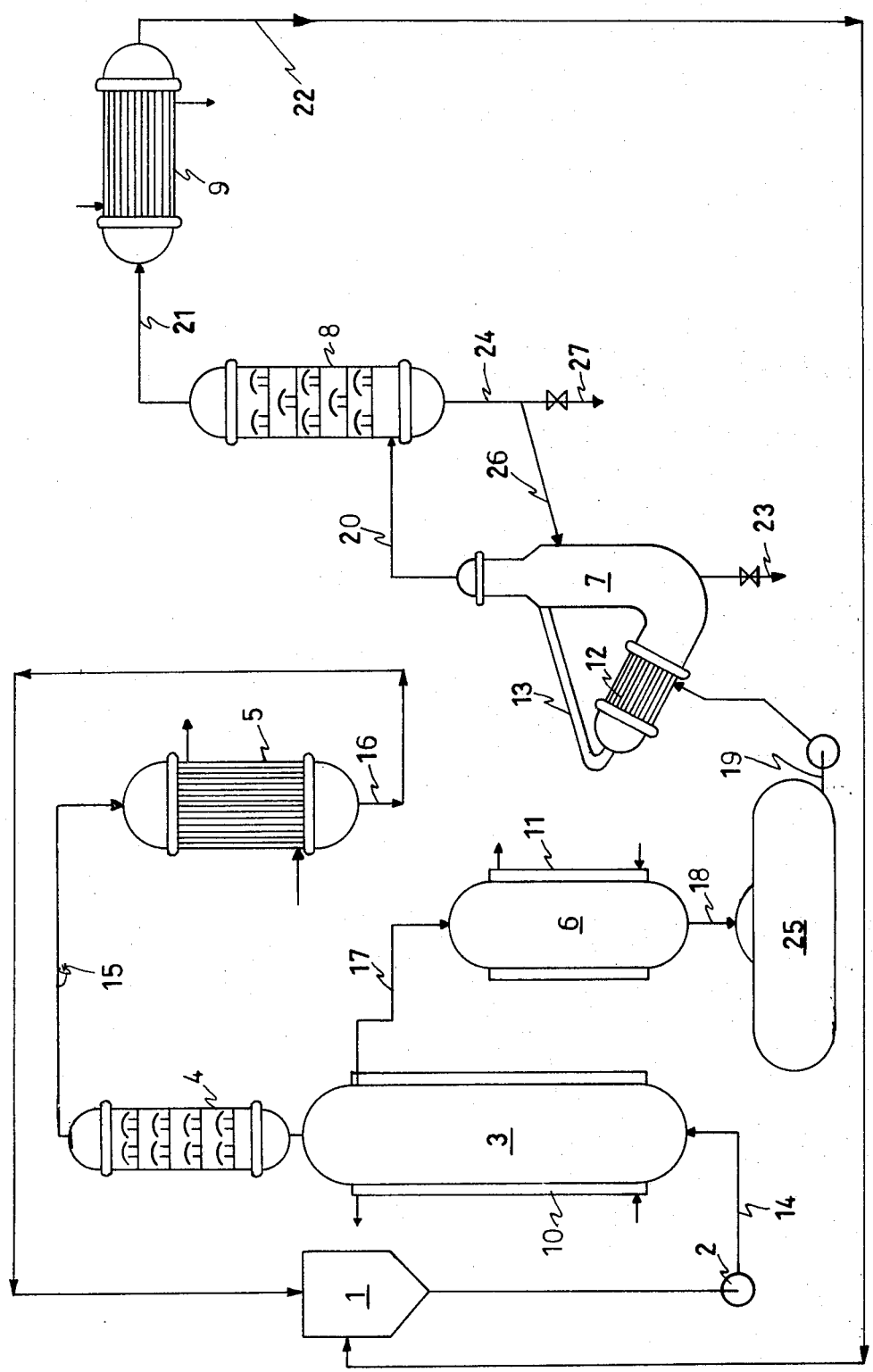

3,829,292
APPARATUS FOR THE PRODUCTION OF
1,2-DIHYDROQUINOLINES
Heliodoro Monroy, Insurgentes Sur 591, 7° Piso,
Mexico City 18, Mexico
Original application Apr. 26, 1971, Ser. No. 137,217, now
abandoned. Divided and this application Feb. 9, 1973,
Ser. No. 331,211
Int. Cl. B01j 9/02, 9/16
U.S. Cl. 23—263          1 Claim

ABSTRACT OF THE DISCLOSURE

Novel substituted 1,2 - dihydroquinolines have antioxidant, bactericidal and fungicidal properties. Said 1,2-dihydroquinolines are prepared by condensing, in the presence of a catalyst, preferably iodine, a substituted aromatic amine with a carbonyl compound, at a temperature of between 90 and 300° C., said catalyst being preferably present together with an activator selected from alkyl or alkaryl halides. Said process is preferably carried out in an apparatus essentially comprising a mixing and feeding device, a first reactor being a packed tower of a height sufficient to provide for the necessary residence time of the reaction mixture in continuous ascending flow therethrough, a second reactor being a packed tower of lesser height, through which the partially reacted mixture descends an evaporator to evaporate the unreacted aromatic amine from the substituted 1,2-dihydroquinoline obtained, and means for stripping the light fractions evolved in the first reactor and in the evaporator and reusing the same as starting materials.

This is a division of application Ser. No. 137,217, filed Apr. 26, 1971, and now abandon.

BACKGROUND OF THE INVENTION

The present invention refers to new 1,2-dihydroquinolines and, more particularly, it is related to new substituted 1,2-dihydroquinolines having excellent antioxidant, bactericidal, insecticidal and fungicidal properties, and to a novel process and novel apparatus for the preparation of substituted 1,2-dihydroquinolines.

The dihydroquinolines in accordance with the present invention are compounds having high antioxidant and pesticidal properties and generally protect various materials against alterations caused by oxygen and by the influence of insects, fungi, bacteriae and other types of parasites.

The dihydroquinolines in accordance with the present invention are represented by the following general formula

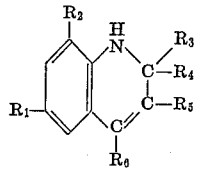

wherein $R_1$ is hydrogen, hydroxy, lower alkoxy, nitro or halogen; $R_2$ is hydrogen, nitro, halogen, alkyl, aryl or carboxyalkyl; $R_3$ is hydrogen or alkyl; $R_4$ is alkyl or aralkyl; $R_5$ is hydrogen or alkyl; and $R_6$ is hydrogen, alkyl or alkaryl.

Dihydroquinolines are highly susceptible to decoloration by the action of the ambient oxygen. For instance, prior publications disclose 1,2-dihydro - 2,2,4 - trimethylquinoline and 1,2-dihydro-2,2,4 - trimethyl - 6 - ethoxyquinoline as products which are considerably degradated and which suffer intensive decolorations with time. Prior publications particularly describe 1,2 - dihydro - 2,2,4-trimethyl-6-ethoxyquinoline as a brown colored product, but it is quite obvious that such a color is due to the action of the oxygen thereon.

However, it is believed that the intensive decoloration of the prior art dihydroquinolines is mainly due to impurities present in such products, inasmuch as, upon carefully distilling the above mentioned dihydroquinolines, it found that they are then much less sensitive to the attack by the oxygen and therefore this proves that, the purer the compound, the less sensitive to the oxygen it is. It is quite probable, therefore, that impurities contained in the commercially available products, are the main cause of decolorations, because said impurities facilitate attack by the oxygen which causes a fast decoloration of said products when the same have not been redistilled.

These compounds can be polymerized through the use of acidic catalysts such as aluminum chloride, boron trifluoride or phosphoric acid in order to produce highly effective antioxidants for rubber and related polymers.

SUMMARY OF THE INVENTION

Having in mind the defects of the prior art dihydroquinolines, it is an object of the present invention to provide new substituted 1,2-dihydroquinolines having highly improved characteristics against decoloration, without the need of having resort to costly purifying procedures.

It is another object of the present invention to provide novel substituted 1,2-dihydroquinolines having high antioxidant, bactericidal, insecticidal and fungicidal properties.

A further object of the present invention is to provide 1,2-dihydroquinolines of the above mentioned character, which will also have an extremely low toxicity to render them useful for their incorporation in food products.

Another object of the present invention is to provide a novel process for the preparation of substituted 1,2-dihydroquinolines, which is of simpler operation as well as of highly economical characteristics.

A further object of this invention is to provide a process of the above mentioned character, which will require a reaction period quite shorter than conventional processes, through the use of suitable catalysts.

It is another object of the present invention to provide an apparatus for carrying out a process of the above mentioned character in a continuous manner to produce substituted 1,2-dihydroquinolines.

BRIEF DESCRIPTION OF THE DRAWINGS

The novel features that are considered characteristic of the present invention are set forth with particularity in the appended claim. The invention itself, however, both as to its organization and its method of operation, together with additional objects and advantages thereof, will best be understood from the following description of a specific embodiment, when read in connection with the accompanying drawing, in which:

The single figure is a flow sheet diagrammatically representing the procedural steps and the preferred apparatus used to prepare substituted 1,2-dihydroquinolines.

DETAILED DESCRIPTION OF THE INVENTION

The process in accordance with the present invention comprises, broadly speaking, condensing, in the presence of suitable catalysts, aromatic amines with aldehydes or ketones containing the group —CO—CH$_2$—.

The condensation reaction is preferably effected at high temperatures, such as between 90 and 300° C., and for a period of time of from about 3 to about 12 hours, which conditions are obtained by feeding a cold mixture of the amine, the carbonyl compound and the catalyst into the bottom of a packed tower of sufficient height to provide for a suitable residence time of the reacting mixture, said packed tower being provided with heating means to obtain the desired reaction temperature. A mixture of the carbonyl compound and water is evolved and the carbonyl compound is recovered by fractional distillation to be dried and reused as a starting material in the process.

A mixture of the desired dihydroquinoline product and unreacted aromatic amine is obtained through the bottom of a secondary reactor fed from the first reactor by the top thereof, and said mixture is distilled to recover the aromatic amine and thus purify the 1,2-dihydroquinoline product.

The process for the obtention of the 1,2-dihydroquinolines according to the present invention can be represented by the following equation:

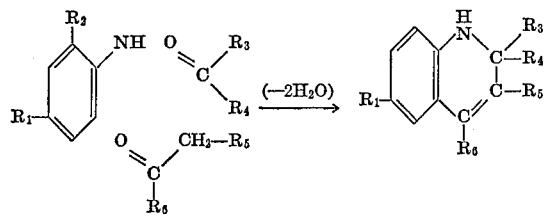

wherein $R_1$ is hydrogen, hydroxy, lower alkoxy, nitro or halogen; $R_2$ is hydrogen, nitro, halogen, alkyl, aryl or carboxyalkyl; $R_3$ is hydrogen or alkyl; $R_4$ is alkyl or aralkyl, $R_5$ is hydrogen or alkyl; and $R_6$ is hydrogen, alkyl or alkaryl.

Any aromatic amine having the above disclosed formula can be used to carry out the process of the present invention, but highly preferable starting compounds are aniline, p-chloroaniline and p-phenetidine for the obtention of substituted 1,2-dihydroquinolines in accordance with the present invention.

Any carbonyl compound represented by the formula disclosed in the above equation can also be used, but the folowing are preferable: Acetone, methyl ethyl ketone, methyl isobutyl ketone and butyraldehyde.

The catalysts preferred to carry out the condensation reaction which forms the main object of the present invention are iodine, p-toluenesulfonic acid and sulfanilic acid, with iodine being the preferred catalyst in view of the fact that it produces the highest yields and requires the shortest reaction periods. Highly preferably, the above catalysts are used in admixture with an activator selected from alkyl or alkenyl halides such as ethylene dichloride, dichloroethylene, trichloroethylene and the like.

The preferred amount of catalyst used in the reaction is of from about 1% to 4%, preferably about 3% by weight on the weight of the aromatic amine.

The activator is desirably added to the catalyst in an amount of from 13% to 80%, preferably about 70% by weight on the weight of catalyst used.

While anyone skilled in the art will clearly understand that the above mentioned process can be effected in any convenient manner such as by letting the starting materials interact in the presence of the catalyst in a batch-type reactor, the present invention contemplates a continuous process which is preferably carried out in an installation of the type diagrammatically shown in the single figure of the drawings.

Having now more particular reference to the drawing, the apparatus for the continuous manufacture of the 1,2-dihydroquinolines of the present invention comprises a mixing vessel 1, a metering feed pump 2, a first reactor 3, a fractional distillation column 4, a condenser 5, a second reactor 6, a surge tank 25, a circulating evaporator 7, a fractional distillation column 8 and a condenser 9.

Reactor 3 is a packed tower provided with external heating means such as an oil jacket 10 or the like, with a suitable packing such as Raschig rings, stainless steel mesh rolls or the like, to provide for a large contacting area, and the height of the column is designed such that a suitable residence time is provided to effect the condensation reaction. Reactor 6 is similar to reactor 3, being a packed tower of a shorter length provided with external heating means such as an oil jacket 11 in order to keep the temperature within the specified desired range.

The process in accordance with the present invention is carried out as follows:

Suitable proportions of the aromatic amine, the carbonyl compound, the catalyst and, if desired, the activator, are continuously fed into the mixing vessel 1 wherein a homogeneous mixture of said ingredients is obtained. The metering feed pump 2 meters a controlled flow of the reaction mixture from vessel 1 into the bottom of reactor 3 through line 14. The mixture is heated to the desired temperature of between about 90 to 300° C., depending on the starting materials used and on the product desired. A mixture of the volatile carbonyl compound and water is vaporized and distilled through the fractionating column 4, in which the higher boiling compounds including water are recycled to reactor 3 while the carbonyl compound is carried through line 15 to a suitable condenser 5, from which the liquid carbonyl compound is removed through line 16 to be reused in the process.

The liquid component of the reaction mixture is discharged through the overflow line 17 to the top of the second reactor 6 in which the reaction is completed, with the product mixed with unreacted aromatic amine being discharged through line 18.

The mixture of the dihydroquinoline, water and unreacted aromatic amine is received in a surge tank 25 from which it is discharged through line 19 into a circulating convection evaporator 7 which operates in a batch-like manner.

The evaporator 7 comprises an inclined pipe bundle 12 at which lower end the mixture of 1,2-dihydroquinoline, water and aromatic amine is fed and circulated through the pipe 13 by means of the convection current created by the pipe bundle 12. The aromatic amine, water and other impurities are evaporated and received in fractionating column 8 through line 20 to be furtherly purified. The heavier fraction consisting of the 1,2-dihydroquinoline entrained in the vapors is removed from the bottom of column 8 through line 24, either to be recycled to the evaporator, through line 26, or to be removed as the final product, through line 27, while the lighter fraction comprising aromatic amine, water and other impurities is vaporized through line 21 and furtherly condensed in condenser 9, whence it is discharged in liquid form through line 22 to be rectified or else reused in the process. The desired product can also be discharged through line 23 from evaporator 7 at suitable intervals.

It will be thus seen that the process for the production of 1,2-dihydroquinolines effected in the apparatus in accordance with the present invention may be considered as a continuous process having a remarkable efficiency and comprising a reaction period of not more than a small fraction of the period of time necessary in a conventional reactor. Also, the design of the continuous reactor of the present invention avoids undue polymerization and resinification of the product formed, in view of the fact that the reaction mixture is subjected to high temperatures only a relatively short time.

The present invention will best be understood by the following illustrative examples, which must be construed as merely illustrative and not restrictive of the true scope of the invention.

EXAMPLE 1

Preparation of 1,2-dihydro-2,2,4-trimethylquinoline 35 g. of metallic iodine, 24 g. of trichloroethylene and 2040 g. of aniline are jointly dissolved in 4020 g. of acetone and the mixture is pumped to reactor 3 of the accompanying drawing at a rate of flow suitable to provide a residence time of about 3.5 hours. The jackets of the reactors are fed with heating oil to raise the temperature of the reaction mixture to about 160° C.

A mixture of water, acetone and aniline is fed to column 4 and practically pure acetone is removed in the form of vapors to be condensed in condenser 5 whence the acetone is recirculated to the process.

The mixture of unreacted aniline and the produc obtained is received in the surge tank 25 and the evaporated and rectified in order to purify the product and remove water and the aniline, to be reused in the process.

The reaction effected in accordance with this example can be represented by the following equation:

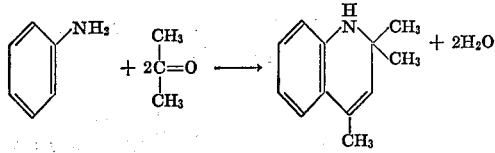

The 1,2-dihydro-2,2,4-trimethylquinoline obtained is a brown colored product having a refractive index at 23° C. of 1.582, a boiling point at 0.1 mm. of mercury of 94 to 96° C. and a specific gravity at 22° C. of 0.9430. The conversion rate per pass calculated on the aniline feed was approximately 45%.

The product obtained is an antioxidant having parasiticide properties, which can be polymerized to enhance its stability and activity.

EXAMPLE 2

Preparation of 1,2-dihydro-2,3,4-trimethyl-2-ethylquinoline

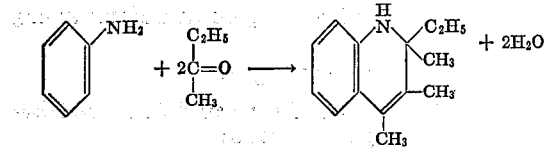

In the same manner described in Example 1, 40 g. of iodine, 28 g. of ethylene dichloride, 2040 g. of aniline and 5000 g. of methyl ethyl ketone are reacted at a temperature of 185° C. for a period of about 5 hours and 40 minutes.

The 1,2-dihydro-2,3,4-trimethyl-2-ethylquinoline thus obtained is a yellow liquid having a refractive index at 24° C. of 1.571, a boiling point at 0.1 mm. of mercury of 110 to 112° C. and a specific gravity at 23.5° C. of 0.9712. The conversion rate per pass calculated on the aniline feed is about 37%.

The product obtained is an excellent antioxidant having remarkable parasiticide properties.

EXAMPLE 3

Preparation of 1,2-dihydro-2,2,4-trimethyl-6-ethoxyquinoline

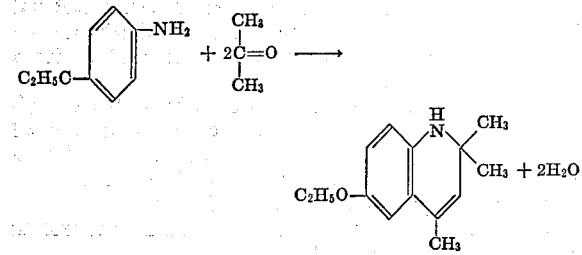

45 g. of metallic iodine, 9 g. of trichloroethylene, 3000 g. of p-phenetidine and 4020 g. of acetone are reacted in the same manner described in Example 1 at a temperature of about 205° C. and at a rate of flow suitable to provide for a residence time of about 4 hours and 40 minutes.

The 1,2-dihydro-2,2,4-trimethyl-6-ethoxyquinoline obtained was a light yellow to amber colored liquid having a refractive index at 20° C. of 1.568, a boiling point at 0.1 mm. of mercury of 134 to 136° C. and a specific gravity at 21° C. of 1.031. The conversion rate per pass calculated on the p-phenitidine was about 40%.

The product obtained proved to be an excellent antioxidant having remarkable insecticide, fungicide and bactericide properties, which can be polymerized to enhance its stability and activity.

EXAMPLE 4

Preparation of 1,2-dihydro-2,3,4-trimethyl-2-ethyl-6-ethoxyquinoline

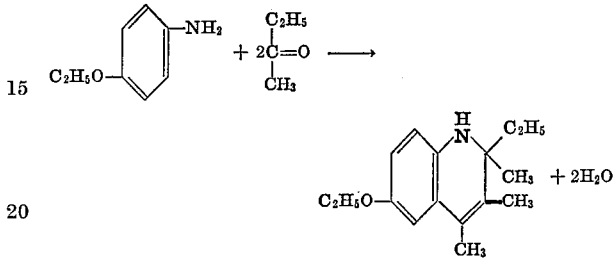

In the same manner described in Example 1, 30 g. of iodine, 21 g. of dichloroethylene, 200 g. of p-phenetidine and 3500 g. of methyl ethyl ketone are reacted at a temperature of about 220° C. and for a period of about 5 hours and 20 minutes.

The 1,2 - dihydro - 2,3,4 - trimethyl-2-ethyl-6-ethoxyquinoline obtained was a yellow to light amber colored liquid having a refractive index at 23° C. of 1.560, a boiling point at 0.1 mm. of mercury of 139 to 141° C. and a specific gravity at 23.2° C. of 0.9858. The conversion rate per pass calculated on the p-phenetidine was of about 38.5%.

The product obtained produced excellent results as an antioxidant and possessed good parasiticide properties.

EXAMPLE 5

Preparation of 1,2-dihydro-2-n-propyl-3-ethylquinoline

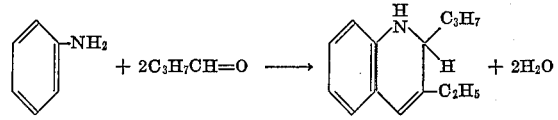

40 g. of sulphanilic acid, 2040 g. of aniline and 5000 g. of n-butyraldehyde are reacted in the same manner described in Example 1, at a temperature of about 180° C. for a period of about 10 hours.

In this particular case iodine and unreacted n-butyraldehyde and aniline are not separately obtained but, on the contrary, the aniline completely reacts forming three different products. The first product is the Schiff base formed between the aniline and the butyraldehyde, represented by the formula

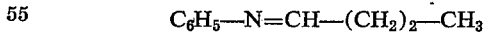

$C_6H_5$—N=CH—$(CH_2)_2$—$CH_3$ having a boiling point at 0.1 mm. of mercury of 98 to 105° C. The second product is the desired 1,2-dihydro-2-n-propyl-3-ethylquinoline and the third product is a resinous soft residue probably comprising a polymerization product of the substituted dihydroquinoline due to the rather long reaction period necessary in this particular case.

The desired product is purified by decantation of the solid residue in the surge tank 25 and is then evaporated and fractionally distilled in order to separate it from the Schiff base, with the latter being reused to continue the reaction for additionally forming the substituted dihydroquinoline.

The 1,2-dihydro-2-n-propyl-3-ethylquinoline obtained was a light lemon green colored liquid having a refractive index at 23° C. of 1.570, a boiling point at 0.1 mm. of mercury of 120 to 122° C. and a specific gravity at 22.5° C. of 0.9776. The conversion rate per pass calculated on the aniline feed was about 35%.

EXAMPLE 6

Preparation of 1,2-dihydro-2-n-propyl-3-ethyl-6-ethoxyquinoline

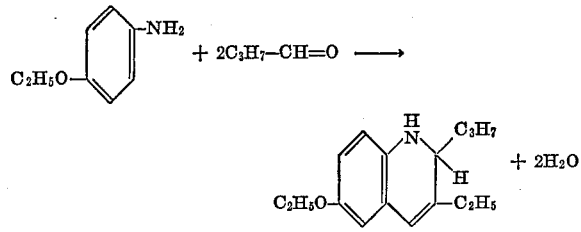

In the same manner described in Example 5, a mixture of 30 g. of p-toluene sulfonic acid, 2000 g. of p-phenetidine and 4400 g. of n-butyraldehyde is reacted at a temperature of about 220° C. and for a period of 4 hours and 15 minutes.

In this particular case the Schiff base of the p-phenetidine and butyraldehyde is also obtained having the formula

$$C_2H_5O-C_6H_4-N=CH-CH_2-CH_2-CH_3$$

with a boiling point at 0.1 mm. of mercury of 140 to 145° C. Also, of course, the desired 1,2-dihydro-2-n-propyl-3-ethyl-6-ethoxyquinoline is formed.

The desired product is fractionally distilled under vacuum in order to purify it and remove the Schiff base, the latter being recirculated to the reaction to additionally form the desired dihydroquinoline.

The 1,2-dihydro-2-n-propyl-3-ethyl-6-ethoxyquinoline obtained was a light lemon green colored liquid with a refractive index at 20° C. of 1.559, a boiling point at 0.1 mm. of mercury of 154 to 158° C. and a specific gravity at 22.7° C. of 1.0006. The yield on the p-phenetidine feed was about 33%.

The product obtained was an excellent antioxidant with very good parasiticide properties.

EXAMPLE 7

Preparation of 1,2-dihydro-2,2,4-trimethyl-6-chloroquinoline

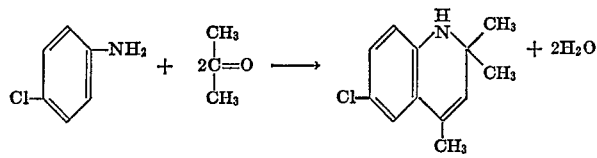

In the same manner described in Example 1 a mixture of 22 moles of p-chloroaniline, 70 moles of acetone with 2% of p-toluene sulfonic acid and 1.4% of ethylene dichloride were reacted at a temperature of about 180° C. for a period of about 5 hours.

The 1,2-dihydro-2,2,4-trimethyl-6-chloroquinoline obtained was an amber colored solid with a melting point of 48 to 49° C. and a boiling point at 0.1 mm. of mercury of 134 to 137° C.

The product obtained was a good antioxidant having parasiticide properties.

EXAMPLE 8

Preparation of 1,2-dihydro-2,3,4-trimethyl-2-ethyl-6-chloroquinoline

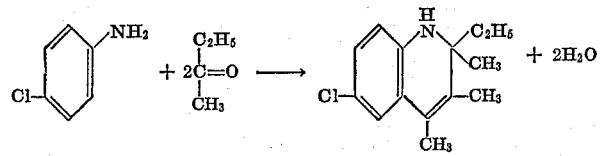

In the same manner described in Example 1, a mixture of 22 moles of p-chloroaniline, 70 moles of methyl ethyl ketone, 2% of iodine and 1.4% of trichloroethylene were reacted at a temperature of about 180° C. for a period of about 5.5 hours.

The 1,2-dihydro-2,3,4-trimethyl-2-ethyl-6-chloroquinoline obtained was an amber colored solid with a melting point of 48 to 49° C. and a boiling point at 0.1 mm. of mercury of 155° C.

The product obtained was a good antioxidant having parasiticide properties.

EXAMPLE 9

Preparation of 1,2-dihydro-2,2,4-trimethyl-8-nitroquinoline

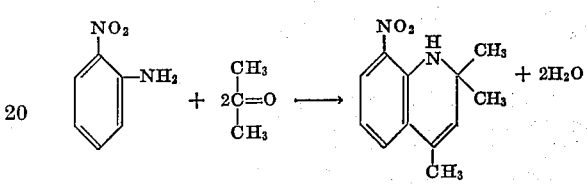

In the same manner described in Example 1 a mixture of 22 moles of o-nitroaniline, 70 moles of acetone with 2% of p-toluene sulfonic acid and 1.4% of ethylene dichloride was reacted at a temperature of about 180° C. for a period of about 4.5 hours.

The 1,2-dihydro-2,2,4-trimethyl-8-nitroquinoline obtained was an amber colored solid with a melting point of about 60° C. and a boiling point at 0.1 mm. of mercury of about 150° C.

The product obtained was a good antioxidant having parasiticide properties.

EXAMPLE 10

Preparation of 1,2-dihydro-2,4-dimethyl-2-isobutyl-3-isopropylquinoline

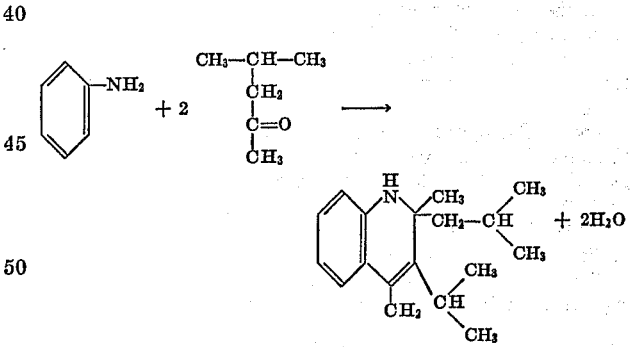

In the same manner described in Example 1, a mixture of 22 moles of aniline, 70 moles of methyl isobutyl ketone, 2% of metallic iodine and 1.4% of ethylene dichloride was reacted at a temperature of 180° C. for a period of about 6 hours.

The 1,2-dihydro-2,4-dimethyl-2-isobutyl-3-isopropylquinoline obtained was an orange yellowish colored liquid having a refractive index at 23° C. of 1.550, a boiling point at 0.1 mm. of mercury of 140 to 145° C. and a specific gravity at 19° C. of 0.9063.

The product obtained was an excellent antioxidant with very good parasiticide properties.

From the above it will be clearly seen that a highly improved and efficient process has been provided for the obtention of substituted 1,2-dihydroquinolines having excellent antioxidant properties and also being very good fungicides, insecticides and bactericides. Also, a novel apparatus to carry out the above described process has been provided, in which the continuous efficient production of the substituted 1,2-dihydroquinolines of the present invention can be effected with increased efficiency and reduced reaction times, thus producing very high quality compounds.

What is claimed is:

1. An apparatus for the continuous production of substituted 1,2-dihydroquinolines by the reaction of an aromatic amine with the corresponding substituted carbonyl compound in the presence of a catalyst, said apparatus comprising:

(1) a first reactor consisting of a tower having a packed extended surface therein and means associated therewith to heat said tower and having a height sufficient to provide the necessary residence time for the reaction mixture ascending therethrough;

(2) means for mixing and feeding the reactants and catalyst to the bottom portion of said first reactor whereby said reactants flow upwardly therethrough producing a reaction mixture comprised of a liquid and a vapor portion;

(3) a second reactor consisting of a tower having a packed extended surface therein and means associated therewith to heat said tower and having a height less than the height of said first reactor;

(4) means to remove the liquid portion of said reaction mixture from the top portion of said first reactor and feed said liquid portion to the top of said second reactor whereby said liquid portion descends therethrough and said reaction is completed thereby producing a first liquid mixture containing the substituted product and unreacted aromatic amine;

(5) first distillation means for distilling the vapor portion of said reaction mixture;

(6) means to feed said vapor portion of said reaction mixture from said first reactor to said first distillation means whereby a first distillation is conducted producing a first heavy liquid fraction which is recycled to the top portion of said first reactor as reflux and a first light vapor fraction comprising unreacted carbonyl compound;

(7) a first condenser means for condensing said first light vapor fraction and means to feed said first light vapor fraction from said first distillation means to said first condenser means, said first condenser means being provided with a first recycle means to recycle the condensed first light vapor fraction to said mixing and feeding means (2);

(8) a surge tank and means to feed said first liquid mixture from the bottom portion of said second reactor to said surge tank means;

(9) evaporator means for separating the substituted product from the unreacted aromatic amine in said first liquid mixture and pumping means for pumping said first liquid mixture from said surge tank means to said evaporator means, said evaporator means comprising a circulating convection evaporator and being provided with means for discharging liquid substituted product therefrom, the evaporation occurring therein producing a second vapor stream containing unreacted aromatic amine and substituted product;

(10) second distillation means for distilling said second vapor stream and means to feed said second vapor stream from said evaporator means to said second distillation means, whereby a second distillation is conducted producing a second heavy liquid fraction comprising substituted product and a second light vapor fraction comprising unreacted aromatic amine, said second distillation means being provided with a liquid substituted product discharge means and a second recycle means to recycle liquid substituted product to said evaporator means; and

(11) a second condenser means for condensing said second light vapor fraction and means to feed said second light vapor fraction from said second distillation means to said second condenser means, said second condenser means being provided with a third recycle means to recycle the condensed second light vapor fraction to said mixing and feeding means (2).

References Cited

UNITED STATES PATENTS 3,322,770   5/1967   D'Alessandro et al. __ 260—283 R

OTHER REFERENCES

Hydrocarbon Processing, vol. 43, No. 9, September 1964, pp. 144, 147 and 176 relied on.

BARRY S. RICHMAN, Primary Examiner

U.S. Cl. X.R.

23—288 E; 260—283 R, 289 R